US012281285B1

(12) United States Patent
Li et al.

(10) Patent No.: US 12,281,285 B1
(45) Date of Patent: Apr. 22, 2025

(54) DETERGENT TABLET FREE OF SLS SURFACTANT AND PREPARATION METHOD THEREOF

(71) Applicant: Guangzhou Joyson Cleaning Products Co., Ltd., Guangdong (CN)

(72) Inventors: Fenglei Li, Guangdong (CN); Min Sun, Guangdong (CN); Jieer Luo, Guangdong (CN); Jieting Yan, Guangdong (CN); Junli Li, Guangdong (CN)

(73) Assignee: Guangzhou Joyson Cleaning Products Co., Ltd., Guangzhou (CN)

( * ) Notice: Subject to any disclaimer, the term of this patent is extended or adjusted under 35 U.S.C. 154(b) by 0 days.

(21) Appl. No.: 18/910,059

(22) Filed: Oct. 9, 2024

Related U.S. Application Data

(63) Continuation of application No. PCT/CN2024/118557, filed on Sep. 12, 2024.

(51) Int. Cl.

| | |
|---|---|
| ***C11D 1/02*** | (2006.01) |
| ***C11D 1/12*** | (2006.01) |
| ***C11D 1/72*** | (2006.01) |
| ***C11D 1/83*** | (2006.01) |
| ***C11D 1/831*** | (2006.01) |

(Continued)

(52) U.S. Cl.
CPC ............ *C11D 3/3753* (2013.01); *C11D 1/831* (2013.01); *C11D 3/14* (2013.01); *C11D 3/2065* (2013.01); *C11D 3/226* (2013.01); *C11D 3/38609* (2013.01); *C11D 3/38627* (2013.01); *C11D 17/0047* (2013.01); *C11D 2111/12* (2024.01)

(58) Field of Classification Search
CPC .. C11D 1/02; C11D 1/12; C11D 1/662; C11D 1/72; C11D 1/83; C11D 3/2006; C11D 3/2065; C11D 3/22; C11D 3/2075; C11D 3/33; C11D 3/37; C11D 3/386; C11D 3/50
See application file for complete search history.

(56) References Cited

U.S. PATENT DOCUMENTS 11,760,962 B1 * 9/2023 Sun .......................... C11D 3/43
510/298

FOREIGN PATENT DOCUMENTS

| | | |
|---|---|---|
| CN | 103740490 A | 4/2014 |
| CN | 105886145 A | 8/2016 |

(Continued)

OTHER PUBLICATIONS

International Search Report and Written Opinion received in corresponding International Patent Application No. PCT/CN2024/118557, mailed Feb. 3, 2025, 16 pages.

*Primary Examiner* — Brian P Mruk
(74) *Attorney, Agent, or Firm* — Cooper Legal Group, LLC

(57) ABSTRACT

This application discloses a detergent tablet free of SLS surfactant and its preparation method. The detergent tablet includes a film-forming agent, an anionic surfactant, a non-ionic surfactant, a chelating agent, an enzyme preparation, an auxiliary agent and a essence. The film-forming agent includes one or more of polyvinyl alcohol, cellulose, and dodecenyl succinate starch ester. The anionic surfactant includes at least two of sodium α-olefin sulfonate, sodium fatty acid methyl ester sulfonate, and sodium hydroxyethyl sulfonate. The non-ionic surfactant includes at least two of fatty alcohol polyoxyethylene ethers, fatty acid methyl ester ethoxylate, and oil ethoxylate.

10 Claims, 2 Drawing Sheets

(51) Int. Cl.

| | |
|---|---|
| ***C11D 3/14*** | (2006.01) |
| ***C11D 3/20*** | (2006.01) |
| ***C11D 3/22*** | (2006.01) |
| ***C11D 3/33*** | (2006.01) |
| ***C11D 3/37*** | (2006.01) |
| ***C11D 3/386*** | (2006.01) |
| ***C11D 3/50*** | (2006.01) |
| ***C11D 17/00*** | (2006.01) |

(56) References Cited

FOREIGN PATENT DOCUMENTS

| | | | |
|---|---|---|---|
| CN | 105886146 | A | 8/2016 |
| CN | 106867710 | A | 6/2017 |
| CN | 107201279 | A | 9/2017 |
| CN | 107312645 | A | 11/2017 |
| CN | 110042004 | A | 7/2019 |
| CN | 112041418 | A | 12/2020 |
| CN | 114395448 | A | 4/2022 |
| CN | 115651778 | A | 1/2023 |

* cited by examiner

DETERGENT TABLET FREE OF SLS SURFACTANT AND PREPARATION METHOD THEREOF

CROSS-REFERENCE TO RELATED APPLICATION

The present application is a continuation of PCT application serial no. PCT/CN2024/118557, filed on Sep. 12, 2024. The entirety of PCT application serial no. PCT/CN2024/118557 is hereby incorporated by reference herein and made a part of this specification.

TECHNICAL FIELD

This application relates to the field of sheet-like detergent products, and more specifically, to a detergent tablet free of SLS surfactant and its preparation method.

BACKGROUND ART

With increasing demand of the people for a better life and concern for environmental protection, they pay attention not only to product performance, but also to product safety.

Sodium alkyl sulfate, also known as "fatty alcohol sodium sulfate", represented by sodium dodecyl sulfate (SLS), is currently the most widely used surfactant in liquid and solid detergent products. SLS, as an anionic surfactant, has strong penetration and dispersion properties, thus possessing strong cleaning power. In addition, SLS has good emulsifying, foaming, and foaming properties, and is currently the most commonly used and extensively used anionic surfactant in cleaning products. It is also an important component that determines the forming and moisture and drying resistance stability of detergent tablet.

However, SLS is a typical skin chemical irritant with strong permeability and irritation, and has strong degreasing power, so that long term exposure may cause skin irritation damage, rash, itching, redness and swelling, and other allergic reactions. In addition, excessive inhalation of SLS may have irritating effects on the respiratory tract. Long term exposure to products containing SLS poses certain risks to both consumers and production workers. In addition, although SLS has good biodegradability, newly discharged and undecomposed SLS entering aquatic ecosystems can cause acute damage to bacteria, microalgae, crustaceans, and fish.

In the skin irritation test (OECD TG439), 5% SLS is used as a positive control to evaluate whether the test substance is irritating. At present, the amount of SLS added to detergent tablets far exceeds 5%. For example, in the existing technology, the addition amount of SLS for detergent tablets in China patent publication no. CN112041418A is 20-36%; in China patent publication no. CN110042004A, SLS addition amount in the anti-staining detergent tablet is 35%; in China patent publication no. CN115651778A, SLS addition amount in the fragrance type detergent tablet is 13-20%; and, in China patent publication no. CN106867710A, SLS addition amount in the detergent tablet is 20-30%.

It can be seen that SLS is widely used in detergent tablets and has a significant impact on the molding and moisture and drying stability of the tablets. However, long-term exposure can cause certain irritation to the skin, respiratory tract, and other areas.

In addition, solid detergent products such as detergent tablets/blocks often do not require a measuring tool for dosage in use, and can be directly added and used in a single tablet/block manner. Therefore, there are certain requirements for the weight and cleaning power of the product, especially for flake detergents. Flake detergent is easy to use and has lightweight. In order to achieve better cleaning performance, enzyme preparations are usually added to achieve strong cleaning. Enzyme preparation can effectively decompose stubborn large molecule stains such as milk stains, sweat stains, and rice stains into small molecule water-soluble substances, and have a mild, safe, and specific effect on decomposing stains, which can enhance the cleaning ability of washing products.

However, SLS has a significant impact on enzyme activity. During the production process, enzyme activity is disrupted by SLS. In addition, the shelf life of detergent products is relatively long. With the increase of storage time, the surfactants in detergent products will gradually destroy the spatial conformation of enzymes, causing a decrease in enzyme activity and thus affecting the cleaning effect of detergent products.

SUMMARY

Using no SLS has a significant impact on the formation and moisture and drying stability of a detergent tablet, and using SLS can prevent enzymes from fully exerting their cleaning effects.

In order to solve the above problems, the present application provides a detergent tablet free of SLS surfactant and its preparation method.

Firstly, the present application provides a detergent tablet free of SLS surfactant, adopting the following technical solution:

- A detergent tablet free of SLS surfactant prepared by drying slurry; wherein the slurry includes the following raw materials by weight percentage: 10%-40% film forming agent, 15%-40% anionic surfactant, 2%-12% non-ionic surfactant, 0.5%-5% chelating agent, 0.4%-4% enzyme preparation, 0.5%-5% auxiliary agent, 0.1%-1% essence, and water;
- The film-forming agent includes film-forming agent A and film-forming agent B, wherein film-forming agent A is polyvinyl alcohol, and film-forming agent B includes at least one of cellulose and dodecenyl succinate starch ester, and a weight ratio of film-forming agent A to film-forming agent B is (2-15):1;
- The anionic surfactant includes at least two of sodium α-olefin sulfonate, sodium fatty acid methyl ester sulfonate, and sodium hydroxyethyl sulfonate;
- The non-ionic surfactant includes at least two of fatty alcohol polyoxyethylene ether, fatty acid methyl ester ethoxylate, oil ethoxylate, EO/PO block polyether, plant saponin, alkyl glycoside, and alcohol ether glycoside; and
- The chelating agent includes at least one of gluconic acid and its salts, glutamic acid diacetic acid and its salts, methyl glycine diacetic acid and its salts, aspartic acid diacetic acid and its salts.

In the technical solution provided in this application, SLS is not used. By selecting specific types of anionic surfactants, non-ionic surfactants, and film-forming agents to work together, the effect of using no SLS on the formation of sheet detergent is compensated. Thereby, the present application can not only obtain sheet-like detergent, but also obtain a detergent endowed with good moisture and drying resistance, as well as quick dissolving in water.

Without using SLS, the decontamination ability of enzyme preparation is no longer suppressed, and the special system of anionic surfactants, non-ionic surfactants, and film-forming agents of specific types also provides a good foundation for the decontamination of enzyme preparation. Moreover, even after long-term storage, enzyme preparation can still play a significant role in cleaning detergent tablet.

Specifically, in this special system, it can promote the adsorption of sodium α-olefin sulfonate, sodium fatty acid methyl ester sulfonate, and sodium hydroxyethyl sulfonate on the surface of enzyme molecules, forming a protective film to prevent enzyme molecules from being attacked by harmful substances from outside, thereby protecting the integrity and activity of enzyme molecules, improving the catalytic efficiency of enzymes, and further enhancing the cleaning power of detergent products. The specially selected non-ionic surfactants have a weaker effect on the central charge of enzyme sites in special systems, and have a smaller impact on enzyme activity, which can further ensure the activity and integrity of enzyme preparation.

In particular, plant saponins, alkyl glycoside, alcohol ether glycosides, etc., as new green surfactants, can significantly reduce the surface tension of the detergent, improve the decontamination effect, and have good foam stability and permeability.

This application further limits the types of chelating agent used in special systems. The organic acid/salt structure contains hydroxyl, carboxyl, and carboxyl groups, which have good chelating ability for various metal ions, helping to remove metal ions from water and prevent their deposition. In addition, it has a certain corrosion inhibition effect on metals and provides protection for production equipment, washing machines, and metal water pipes during production and use.

Preferably, the film-forming agents are film-forming agent A and film-forming agent B, wherein film-forming agent A is polyvinyl alcohol and film-forming agent B is cellulose;

Preferred cellulose is at least one of modified hydroxyethyl cellulose, hydroxypropyl cellulose, and hydroxypropyl methyl cellulose.

By adopting the above technical solutions, hydroxyethyl cellulose, hydroxypropyl cellulose, hydroxypropyl methyl cellulose, and dodecenyl succinate starch ester have the advantages of acid-base stability, biodegradability, and resistance to salt precipitation. Blending with polyvinyl alcohol can increase the viscosity of the slurry and enhance its storage moisture resistance.

The anionic surfactants are sodium α-olefin sulfonate and sodium fatty acid methyl ester sulfonate.

Preferably, based on the weight percentage of the slurry, the polyvinyl alcohol is 10-26% and the cellulose is 1-5%; and the sodium α-olefin sulfonate is 15-25%, and the sodium fatty acid methyl ester sulfonate is 5-15%.

Preferably, the non-ionic surfactant is at least two of fatty alcohol polyoxyethylene ether, fatty acid methyl ester ethoxylate, and oil ethoxylate.

Preferably, based on the weight percentage of the slurry, the fatty alcohol polyoxyethylene ether is 1-5%.

Preferably, based on the weight percentage of the slurry, the oil ethoxylate is 1-5%.

Preferably, based on the weight percentage of the slurry, the fatty acid methyl ester ethoxylate is 1-5%.

The preferred non-ionic surfactants are oil ethoxylate and alkyl glycoside.

Preferably, based on the weight percentage of the slurry, the oil ethoxylate is 1-5%, and the alkyl glycoside is 0.1-2%.

Preferred non-ionic surfactants include fatty acid methyl ester ethoxylate and plant saponins.

Preferably, based on the weight percentage of the slurry, the fatty acid methyl ester ethoxylate is 3-7%, and the plant saponin is 0.1-3%.

By adopting the above technical solution, the selection and dosage combination of anionic surfactants are further limited, and the combination and dosage combination of non-ionic surfactants are further limited, so that there is a better coordination effect between non-ionic surfactants, anionic surfactants, film-forming agents and enzyme preparation, which can compensate for the impact of using no SLS and enhance the cleaning, moisture resistance, dryness resistance and other properties of detergent tablet.

It is worth mentioning that sodium α-olefin sulfonate and sodium fatty acid methyl ester sulfonate are a type of anionic surfactant with high foaming, good hydrolysis stability, and strong resistance to hard water. With further limitations in this application, they can more fully improve the pH value and ionic strength of the washing environment, creating a more suitable environment for enzyme preparation.

Preferably, the slurry further includes 0-25% filler.

Preferably, the filler includes at least one of corn starch, pea starch, cassava starch, zeolite, bentonite, kaolin, sodium sulfate, sodium carbonate, and sodium bicarbonate.

When the amount of surfactant added is low, fillers can be used to assist in forming; and also serve washing aid function. Among them, zeolite, bentonite, and kaolin are natural chelating agent with layered or porous structures. They capture and fix metal ions such as calcium and magnesium in water through electrostatic adsorption or ion exchange. In addition, they have a large specific surface area and can adsorb oil stains and prevent them from depositing on fabrics again.

Preferably, the enzyme preparation includes at least two of cellulase, protease, amylase, lipase, pectinase, mannanase, and phosphodiesterase.

Preferably, the auxiliary agent includes at least one of glycerol, propylene glycol, and glucose alcohol.

Secondly, the present application provides a method for preparing detergent tablet without SLS surfactants, adopting the following technical solution:

a method for preparing detergent tablet free of SLS surfactant, including the following steps:

Step 1: mixing film-forming agent A with water at 75-85° C. until completely swelling and dissolving;

Step 2: adding film-forming agent B and continuing to stir until fully dissolved;

Step 3: adding chelating agent, anionic surfactant, and non-ionic surfactant, and dissolving for 15-60 minutes;

Step 4: adding the rest of raw materials at 40-45° C. to obtain a slurry; and

Step 5: drying the slurry, and form into tablets to obtain detergent tablet without SLS surfactants.

In summary, this application has the following beneficial effects.

1. This application omits SLS for preparing detergent tablet and uses specific mild non-ionic and anionic surfactants to avoid skin irritation and respiratory irritation caused by SLS. During production, the harm to workers and consumers is minimized.
2. The specific types of anionic surfactants, non-ionic surfactants, and film-forming agents used in this application work together to compensate for the impact of omitting SLS on the formation of sheet-like detergents. Thereby, the present application can not only obtain sheet-like detergent, but also obtain a detergent endowed with good moisture and drying resistance, as well as quick dissolving in water.

3. Without using SLS, the decontamination ability of enzyme preparation is no longer suppressed. The special system of this application can protect the integrity and activity of enzyme molecules, improve the catalytic efficiency of enzymes, and provide a good foundation for the decontamination of enzyme preparation. Even after long-term storage, enzyme preparation can still play a significant role in cleaning detergent tablet.

DETAILED DESCRIPTION

Figure 1:
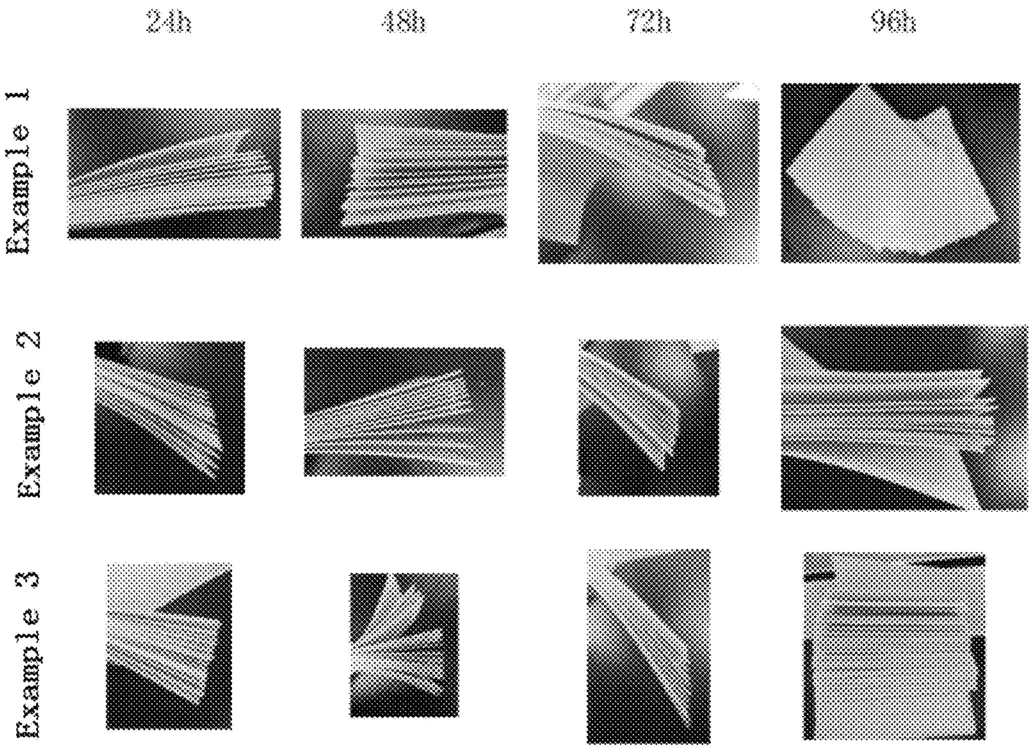
FIG. 1 shows test results of detergent tablet of Examples 1-3 in Test 2.

The following provides further detailed explanations of the present application in conjunction with the accompanying drawings and examples.

The raw materials used in the following examples and comparative examples are all commercially available products.

The following is an explanation of the sources of some of the raw materials used in this application:

Modified hydroxyethyl cellulose can be selected from Guangzhou Flower King Chemical Co., Ltd. QP-100MH, with a viscosity of 4400-6000.

Modified hydroxypropyl cellulose can be selected from H-HPC of Changsha Gumeng Chemical Technology Co., Ltd.

Modified hydroxypropyl methyl cellulose can be selected from Hebei Yida Cellulose Co., Ltd. XWS-69, with a viscosity of 60000.

Oil ethoxylate can be selected from SOE-N-60 of Wanhua Chemical Group Co., Ltd.

EO/PO block polyether can be available from Liaoning Cologne Fine Chemical Co., Ltd.

Plant saponin can be selected from Guangdong Jingcui Biotechnology Co., Ltd.

Example 1

A detergent tablet free of SLS surfactant was prepared by drying slurry.

The slurry included the following raw materials: film-forming agent, anionic surfactant, non-ionic surfactant, chelating agent, enzyme preparation, auxiliary agent, essence and water.

The film forming agent included film forming agent A and film forming agent B. The film forming agent A is polyvinyl alcohol, and the film forming agent B is modified hydroxyethyl cellulose.

The anionic surfactant was sodium α-olefin sulfonate and sodium fatty acid methyl ester sulfonate.

The non-ionic surfactant included fatty alcohol polyoxyethylene ether and oil ethoxylate.

The chelating agent was gluconic acid or sodium gluconate.

The enzyme preparation (liquid) included protease and amylase.

The auxiliary agent was glycerol.

Specifically, the slurry included 26 kg of polyvinyl alcohol, 5 kg of hydroxyethyl cellulose, 20 kg of sodium α-olefin sulfonate, 10 kg of sodium fatty acid methyl ester sulfonate, 2 kg of fatty alcohol polyoxyethylene ether, 1 kg of oil ethoxylate, 0.15 kg of gluconic acid, 1.35 kg of sodium gluconate, 0.5 kg of protease, 0.5 kg of starch enzyme, 1.0 kg of glycerol, 0.2 kg of essence, and 32.3 kg of water.

This example also provided a method for preparing detergent tablet without SLS surfactant, including the following steps:

- Step 1: mixing film-forming agent A with water at 80° C. and stirring at constant temperature until the material swells and dissolves completely.
- Step 2: adding film-forming agent B to the material in step 1 and continuing to stir until fully dissolved.
- Step 3: adding chelating agent, anionic surfactant, and non-ionic surfactant to the material in Step 2, and stirring for 30 minutes to dissolve.
- Step 4: cooling down to 42° C., adding the remaining raw materials to the material in Step 3, and continuing to stir uniformly to obtain a slurry.
- Step 5: drying the slurry, forming, and slicing to obtain detergent tablet without SLS surfactant.

Example 2

A detergent tablet free of SLS surfactant was provided, different from Example 1 in that, Film forming agent A was polyvinyl alcohol, and film forming agent B was modified hydroxypropyl cellulose.

The anionic surfactants were sodium α-olefin sulfonate and sodium fatty acid methyl ester sulfonate.

The non-ionic surfactant included fatty acid methyl ester ethoxylate and plant saponin.

The chelating agent were gluconic acid and sodium gluconate.

The enzyme preparation (liquid) included mannanase, protease, amylase, and lipase.

The auxiliary agent was propylene glycol.

Specifically, the slurry included: 15 kg of polyvinyl alcohol, 3 kg of hydroxypropyl cellulose, 20 kg of sodium α-olefin sulfonate, 10 kg of sodium fatty acid methyl ester sulfonate, 4 kg of fatty acid methyl ester ethoxylate, 1 kg of plant saponin, 0.15 kg of gluconic acid, 1.3 kg of sodium gluconate, 0.2 kg of mannanase, 0.5 kg of protease, 0.5 kg of amylase, 0.5 kg of lipase, 2.0 kg of propylene glycol, 0.2 kg of essence, and 41.65 kg of water.

The preparation method of a detergent tablet was the same as Example 1, and was not repeated here.

Example 3

A detergent tablet free of SLS surfactant was provided, different from Example 1 in that, the slurry included the following raw materials: film-forming agent, anionic surfactant, non-ionic surfactant, chelating agent, enzyme preparation, auxiliary agent, essence, water and filler.

Film forming agent A was polyvinyl alcohol, and film forming agent B was modified hydroxypropyl methyl cellulose.

The anionic surfactants were sodium α-olefin sulfonate and sodium fatty acid methyl ester sulfonate.

The non-ionic surfactant included oil ethoxylate and alkyl glycoside.

The chelating agent was sodium gluconate.

The enzyme preparation (liquid) included pectinase, protease, amylase, and lipase.

The auxiliary agent was glycerol.

The filler was kaolin.

Specifically, the slurry included 12 kg of polyvinyl alcohol, 4 kg of hydroxypropyl methyl cellulose, 15 kg of sodium α-olefin sulfonate, 5 kg of sodium fatty acid methyl ester sulfonate, 3 kg of oil ethoxylate, 1 kg of alkyl glycoside, 5 kg of kaolin, 1.3 kg of sodium gluconate, 0.2 kg of pectinase, 0.5 kg of protease, 0.5 kg of amylase, 0.5 kg of lipase, 2.5 kg of glycerol, 0.2 kg of essence, and 49.3 kg of water.

The preparation method of a detergent tablet was the same as Example 1, and was not repeated here.

Example 4

A detergent tablet free of SLS surfactant was provided, different from Example 3 in that, the slurry included the following raw materials: film-forming agent, anionic surfactant, non-ionic surfactant, chelating agent, enzyme preparation, auxiliary agent, essence, water and filler.

The film forming agent A was polyvinyl alcohol, and film forming agent B was hydroxyethyl cellulose or hydroxypropyl methyl cellulose.

The anionic surfactants were sodium α-olefin sulfonate and sodium fatty acid methyl ester sulfonate.

The non-ionic surfactant included EO/PO block polyether and alcohol ether glycoside.

The chelating agent was trisodium aspartate diacetate.

The enzyme preparation (liquid) were proteases and lipases.

The auxiliary agent was glycerol.

The filler was corn starch.

Specifically, the slurry included: 10 kg of polyvinyl alcohol, 1 kg of hydroxyethyl cellulose, 1 kg of hydroxypropyl methyl cellulose, 10 kg of sodium α-olefin sulfonate, 5 kg of sodium fatty acid methyl ester sulfonate, 10 kg of corn starch, 10 kg of EO/PO block polyether, 2 kg of alcohol ether glycoside, 1.3 kg of trisodium aspartate diacetate, 0.5 kg of protease, 0.5 kg of lipase, 2.5 kg of glycerol, 0.25 kg of essence, and 45.95 kg of water.

The preparation method of a detergent tablet was the same as Example 1, and was not repeated here.

Example 5

A detergent tablet without SLS surfactant, which was different from Embodiment 1 in that, the slurry included 26 kg of polyvinyl alcohol, 5 kg of hydroxyethyl cellulose, 25 kg of sodium α-olefin sulfonate, 15 kg of sodium fatty acid methyl ester sulfonate, 2 kg of fatty alcohol polyoxyethylene ether, 1 kg of fatty acid methyl ester ethoxylate, 0.15 kg of gluconic acid, 1.35 kg of sodium gluconate, 0.5 kg of protease, 0.5 kg of amylase, 1.0 kg of glycerol, 0.2 kg of essence, and 22.3 kg of water.

The preparation method of a detergent tablet was the same as Example 1, and was not repeated here.

COMPARATIVE EXAMPLES

Comparative Example 1

A detergent tablet differs from Example 1 in that only sodium dodecyl sulfate was used as the anionic surfactant.

Namely, the slurry included: 26 kg of polyvinyl alcohol, 5 kg of hydroxyethyl cellulose, 30 kg of sodium dodecyl sulfate, 2 kg of fatty alcohol polyoxyethylene ether, 1 kg of alkyl glycoside, 0.15 kg of gluconic acid, 1.35 kg of sodium gluconate, 0.5 kg of protease, 0.5 kg of amylase, 1.0 kg of glycerin, 0.2 kg of essence, and 32.3 kg of water.

The preparation method of a detergent tablet was the same as Example 1, and was not repeated here.

Comparative Example 2

A detergent tablet differs from Embodiment 1 in that, the slurry included 26 kg of polyvinyl alcohol, 5 kg of hydroxyethyl cellulose, 10 kg of sodium dodecyl sulfate, 10 kg of sodium α-olefin sulfonate, 10 kg of sodium fatty acid methyl ester sulfonate, 2 kg of fatty alcohol polyoxyethylene ether, 1 kg of alkyl glycoside, 0.15 kg of gluconic acid, 1.35 kg of sodium gluconate, 0.5 kg of protease, 0.5 kg of amylase, 1.0 kg of glycerol, 0.2 kg of essence, and 32.3 kg of water.

The preparation method of a detergent tablet was the same as Example 1, and was not repeated here.

Comparative Example 3

A detergent tablet free of SLS surfactant differs from Example 1 in that, an equal amount of citric acid was used instead of gluconic acid, and an equal amount of sodium citrate was used instead of an equal amount of sodium gluconate.

The slurry included: 26 kg of polyvinyl alcohol, 5 kg of hydroxyethyl cellulose, 20 kg of α-olefin sulfonate, 10 kg of fatty acid methyl ester sulfonate, 2 kg of fatty alcohol polyoxyethylene ether, 1 kg of alkyl glycoside, 0.15 kg of citric acid, 1.35 kg of sodium citrate, 0.5 kg of protease, 0.5 kg of amylase, 1.0 kg of glycerin, 0.2 kg of essence, and 32.3 kg of water.

The preparation method of a detergent tablet was the same as Example 1, and was not repeated here.

Comparative Example 4

A detergent tablet free of SLS surfactant differs from Example 1 in that, the enzyme preparation was omitted and the amount of the original enzyme preparation was replaced with water.

The preparation method of a detergent tablet was the same as Example 1, and was not repeated here.

Comparative Example 5

A detergent tablet free of SLS surfactant differs from Comparative Example 1 in that, the enzyme preparation was omitted and the amount of the original enzyme preparation was replaced with water.

The preparation method of a detergent tablet was the same as Example 1, and was not repeated here.

Comparative Example 6

A detergent tablet free of SLS surfactant differs from Comparative Example 2 in that the enzyme preparation was omitted and amount of the original enzyme preparation was replaced with water.

The preparation method of a detergent tablet was the same as Example 1, and was not repeated here.

Comparative Example 7

A detergent tablet free of SLS surfactant differs from Comparative Example 3 in that the enzyme preparation was omitted and the amount of the original enzyme preparation was replaced with water.

The preparation method of a detergent tablet was the same as Example 1, and was not repeated here.

Comparative Example 8

A detergent tablet free of SLS surfactant differs from Example 2 in that polyvinylpyrrolidone was used instead of an equal amount of hydroxypropyl cellulose.

The slurry included: 15 kg of polyvinyl alcohol, 3 kg of polyvinyl pyrrolidone, 20 kg of sodium α-olefin sulfonate, 10 kg of sodium fatty acid methyl ester sulfonate, 4 kg of fatty acid methyl ester ethoxylate, 1 kg of plant saponin, 0.15 kg of gluconic acid, 1.3 kg of sodium gluconate, 0.2 kg of mannanase, 0.5 kg of protease, 0.5 kg of amylase, 0.5 kg of lipase, 2.0 kg of propylene glycol, 0.2 kg of essence, and 41.65 kg of water.

The preparation method of a detergent tablet was the same as Example 1, and was not repeated here.

Comparative Example 9

A detergent tablet free of SLS surfactant differs from Example 2 in that hydroxypropyl cellulose was omitted and the amount of the original hydroxypropyl cellulose was replaced with water.

The slurry included: polyvinyl alcohol 15 kg, sodium α-olefin sulfonate 20 kg, sodium fatty acid methyl ester sulfonate 10 kg, fatty acid methyl ester ethoxylate 4 kg, plant saponin 1 kg, gluconic acid 0.15 kg, sodium gluconate 1.3 kg, mannanase 0.2 kg, protease 0.5 kg, amylase 0.5 kg, fatty enzyme 0.5 kg, propylene glycol 2.0 kg, essence 0.2 kg, water 44.65 kg.

The preparation method of a detergent tablet was the same as Example 1, and was not repeated here.

Comparative Example 10

A detergent tablet free of SLS surfactant differs from Example 2 in that the mass ratio of polyvinyl alcohol to hydroxypropyl cellulose was 1:1.

The slurry included: 15 kg of polyvinyl alcohol, 15 kg of hydroxypropyl cellulose, 20 kg of α-olefin sulfonate, 10 kg of fatty acid methyl ester sulfonate, 4 kg of fatty acid methyl ester ethoxylate, 1 kg of plant saponin, 0.15 kg of gluconic acid, 1.3 kg of sodium gluconate, 0.2 kg of mannanase, 0.5 kg of protease, 0.5 kg of amylase, 0.5 kg of lipase, 2.0 kg of propylene glycol, 0.2 kg of essence, and 29.65 kg of water.

The preparation method of a detergent tablet was the same as Example 1, and was not repeated here.

Comparative Example 11

A detergent tablet free of SLS surfactant differs from Example 2 in that the mass ratio of polyvinyl alcohol to hydroxypropyl cellulose was 16:1.

The slurry included: 16 kg of polyvinyl alcohol, 1 kg of hydroxypropyl cellulose, 20 kg of α-olefin sulfonate, 10 kg of fatty acid methyl ester sulfonate, 4 kg of fatty acid methyl ester ethoxylate, 1 kg of plant saponin, 0.15 kg of gluconic acid, 1.3 kg of sodium gluconate, 0.2 kg of mannanase, 0.5 kg of protease, 0.5 kg of amylase, 0.5 kg of lipase, 2.0 kg of propylene glycol, 0.2 kg of essence, and 42.65 kg of water.

The preparation method of a detergent tablet was the same as Example 1, and was not repeated here.

Comparative Example 12

A detergent tablet, different from Example 1 in that the slurry includes 8 kg of polyvinyl alcohol, 20 kg of sodium dodecyl sulfate, 8 kg of sodium dodecyl sulfonate, 0.88 kg of citric acid, 5 kg of glycerol, 5 kg of lauroyl propyl betaine, 1.5 kg of fatty alcohol polyoxyethylene ether, 3 kg of teatea tree essential oil, 3 kg of potassium cocoate, 3 kg of rhamnolipids and pectinase, 0.5 kg of protease, and 41.62 kg of water.

A method for preparing detergent tablet was provided, including the following steps:

Step 1: mixing polyvinyl alcohol with water at 80° C. and stirring at a constant temperature until the material swells and dissolves completely.

Step 2: adding citric acid, sodium dodecyl sulfate, sodium dodecyl sulfonate, lauroyl propyl betaine, fatty alcohol polyoxyethylene ether, tea tree essential oil, plant surfactant, and rhamnolipid to the material in Step 1, and stirring to dissolve for 30 minutes.

Step 3: cooling down to 42° C., adding the remaining raw materials to the material in Step 2, and continuing to stir uniformly to obtain a slurry.

Step 4: drying the slurry, forming, and slicing to obtain detergent tablet.

Comparative Example 13

A detergent tablet differs from Comparative Example 12 in that an equal amount of sodium dodecyl sulfate was used instead of sodium dodecyl sulfate.

The slurry included: 8 kg of polyvinyl alcohol, 28 kg of sodium dodecyl sulfonate, 0.88 kg of citric acid, 5 kg of propylene glycol, 5 kg of lauroyl propyl betaine, 1.5 kg of fatty alcohol polyoxyethylene ether, 3 kg of tea tree essential oil, 3 kg of potassium cocoate, 3 kg of rhamnolipids, 0.5 kg of pectinase, 0.5 kg of protease, and 41.62 kg of water.

The preparation method of a detergent tablet was the same as that of Comparative Example 12, and was not be repeated here.

Comparative Example 14

A detergent tablet differs from Comparative Example 12 in that,

The slurry included 8 kg of polyvinyl alcohol, 10 kg of sodium dodecyl sulfate, 18 kg of sodium dodecyl sulfonate, 0.88 kg of citric acid, 5 kg of glycerol, 5 kg of lauroyl propyl betaine, 1.5 kg of fatty alcohol polyoxyethylene ether, 3 kg of tea tree essential oil, 3 kg of potassium cocoate, 3 kg of rhamnolipids and pectinase, 0.5 kg of protease, and 41.62 kg of water.

The preparation method of a detergent tablet was the same as that of Comparative Example 12, and was not be repeated here.

Comparative Example 15

A detergent tablet free of SLS surfactant differs from Example 1 in that the non-ionic surfactant was laurylaminopropyl betaine.

The slurry included 26 kg of polyvinyl alcohol, 5 kg of hydroxyethyl cellulose, 20 kg of sodium α-olefin sulfonate, 10 kg of sodium fatty acid methyl ester sulfonate, 3 kg of lauryl propyl betaine, 0.15 kg of gluconic acid, 1.35 kg of sodium gluconate, 0.5 kg of protease, 0.5 kg of amylase, 1.0 kg of glycerol, 0.2 kg of essence, and 32.3 kg of water.

The preparation method of a detergent tablet was the same as Example 1, and was not repeated here.

Performance Testing Experiment

Test 1: Cleanness

According to GB/T 13174-2021 “Determination of cleaning power and cyclic washing performance of detergent tablets”, the washing water was 250 mg/kg of $CaCl_2$ hard water, and the test cloth was national standard carbon black JB-01 dirty cloth, national standard protein JB-02 dirty cloth, and national standard sebum JB-03 dirty cloth. Using 0.2% standard detergent tablet as a control, the stain removal ratio Pi was obtained. The test results were shown in Tables 1-1, 1-2, 1-3, and 1-4, respectively.

In particular, Pi≥1.0 was considered qualified, and Pi<1.0 was considered unqualified.

$$P_i = \frac{\Delta A}{\Delta B}$$

Δ A was the difference in whitenesses of the test fabric before and after washing by using the detergent tablet Δ B was the difference in whitenesses of the test fabric before and after washing with standard detergent tablet

TABLE 1-1

The difference in stain removal ratio between detergent tablets using enzyme and without using enzyme (detergent tablet concentration of 0.2%)

| Enzyme Group | Group without using enzyme | Pi difference between the enzyme group and the group without using enzyme | | |
|---|---|---|---|---|
| | | JB-01 | JB-02 | JB-03 |
| Example 1 | Comparative Example 4 | 0.07 | 5.13 | 0.03 |
| Comparative Example 1 | Comparative Example 5 | 0.08 | 2.62 | 0.02 |
| Comparative Example 2 | Comparative Example 6 | 0.09 | 3.55 | 0.09 |
| Comparative Example 3 | Comparative Example 7 | 0.14 | 4.61 | −0.12 |

In the case of using enzyme preparation, sodium dodecyl sulfate was simultaneously used in Comparative Example 1-2. According to the detection results in Table 1-1, it can be seen that, compared with Example 1, the cleaning ability of the enzyme preparation cannot be fully utilized, and Comparative Example 1-2 destroyed the combination of anionic surfactants, non-ionic surfactants, and film-forming agents, resulting in a significant decrease in cleaning ability. The chelating agent used in Example 1 were gluconic acid and sodium gluconate, and the cleaning ability of this combination was better than that of Comparative Example 3 using citric acid and sodium citrate. It is speculated that this may be due to the stronger chelating ability of grape acid and its salts compared to citric acid and its salts, which enhances the cleaning power of detergent tablet in hard water.

TABLE 1-2

Cleaning Effect on Day 1 of Room Temperature Storage

| Concentration | Group | Stain removal ratio Pi JB-01 | JB-02 | JB-03 | Comprehensive stain removal |
|---|---|---|---|---|---|
| 0.05% | Example 1 | 1.00 | 3.02 | 0.96 | 4.98 |
| | Example 2 | 1.00 | 3.05 | 0.95 | 5.00 |
| | Example 3 | 1.03 | 3.10 | 0.98 | 5.11 |
| | Comparative Example 1 | 1.00 | 1.86 | 0.95 | 3.81 |
| | Comparative Example 2 | 1.06 | 2.02 | 1.07 | 4.15 |
| | Comparative Example 3 | 1.06 | 2.55 | 0.98 | 4.59 |
| | Comparative Example 4 | 0.86 | 0.86 | 1.06 | 2.78 |
| | Comparative Example 5 | 0.89 | 0.73 | 1.20 | 2.82 |
| | Comparative Example 6 | 0.83 | 0.82 | 1.03 | 2.68 |
| | Comparative Example 7 | 0.84 | 0.86 | 1.24 | 2.94 |
| 0.20% | Example 1 | 1.08 | 6.21 | 1.54 | 8.83 |
| | Example 2 | 1.07 | 6.28 | 1.60 | 8.95 |
| | Example 3 | 1.12 | 6.37 | 1.63 | 9.12 |
| | Comparative Example 1 | 1.12 | 3.60 | 1.72 | 6.44 |
| | Comparative Example 2 | 1.07 | 4.58 | 1.50 | 7.15 |
| | Comparative Example 3 | 1.09 | 5.65 | 1.44 | 8.18 |
| | Comparative Example 4 | 1.01 | 1.08 | 1.51 | 3.60 |
| | Comparative Example 5 | 1.04 | 0.98 | 1.70 | 3.72 |
| | Comparative Example 6 | 0.98 | 1.03 | 1.41 | 3.42 |
| | Comparative Example 7 | 0.95 | 1.04 | 1.56 | 3.55 |

SLS was added to the detergent tablet of Comparative Examples 1 and 2, so theoretically, their stain removal ability should be stronger than that of mild surfactants. However, due to the influence of SLS on enzyme preparation, the decontamination ability of enzyme preparation cannot be fully utilized, so the decontamination effect of Comparative Examples 1-2 was far inferior to that of Examples 1-3.

TABLE 1-3

Decontamination Effect on Day 3 of Room Temperature Storage

| Concentration | Group | Stain removal ratio Pi JB-01 | JB-02 | JB-03 | Comprehensive stain removal |
|---|---|---|---|---|---|
| 0.05% | Example 1 | 1.01 | 3.00 | 1.04 | 5.05 |
| | Example 2 | 1.00 | 3.12 | 1.05 | 5.17 |
| | Example 3 | 1.01 | 3.15 | 1.04 | 5.20 |
| | Comparative Example 1 | 0.91 | 2.30 | 0.93 | 4.14 |
| | Comparative Example 2 | 1.03 | 2.15 | 1.07 | 4.25 |
| | Comparative Example 3 | 1.04 | 2.53 | 1.11 | 4.68 |
| 0.20% | Example 1 | 1.06 | 5.61 | 1.60 | 8.27 |
| | Example 2 | 1.05 | 5.74 | 1.67 | 8.46 |
| | Example 3 | 1.06 | 5.80 | 1.67 | 8.53 |
| | Comparative Example 1 | 1.07 | 4.00 | 1.56 | 6.63 |
| | Comparative Example 2 | 1.11 | 4.41 | 1.56 | 7.08 |
| | Comparative Example 3 | 1.07 | 4.90 | 1.52 | 7.49 |

TABLE 1-4

Cleaning Effect on Day 7 of Room Temperature Storage

| Concentration | Group | Stain removal ratio Pi JB-01 | JB-02 | JB-03 | Comprehensive stain removal |
|---|---|---|---|---|---|
| 0.05% | Example 1 | 0.94 | 2.57 | 1.03 | 4.54 |
| | Example 2 | 0.95 | 2.62 | 1.05 | 4.62 |
| | Example 3 | 0.97 | 2.68 | 1.05 | 4.70 |
| | Comparative Example 1 | 1.03 | 1.92 | 1.16 | 4.11 |
| | Comparative Example 2 | 0.93 | 2.18 | 1.03 | 4.14 |
| | Comparative Example 3 | 0.98 | 2.11 | 1.12 | 4.21 |
| 0.20% | Example 1 | 1.01 | 5.08 | 1.63 | 7.72 |
| | Example 2 | 1.02 | 5.18 | 1.67 | 7.87 |
| | Example 3 | 1.04 | 5.27 | 1.70 | 8.01 |
| | Comparative Example 1 | 1.06 | 3.56 | 1.83 | 6.45 |
| | Comparative Example 2 | 1.08 | 4.20 | 1.51 | 6.79 |
| | Comparative Example 3 | 1.02 | 4.77 | 1.47 | 7.26 |

According to the test data in Table 1, it can be seen that the detergent tablet of Examples 1-3 exhibit strong stain removal ability during storage of 1, 3, and 7 days.

Test 2: Moisture Resistance

A box of detergent tablets (stacked on top of each other) was placed in a testing environment with a temperature of (25±2° C.) and a relative humidity of (85±5) %. The test was repeated for 4 groups, and one group was taken out at 24, 48, 72, and 96 hours, respectively. Then two detergent tablets were separated and observe whether there was adhesion between them was observed. The results were recorded in Table 2.

The adhesion phenomenon can assume no adhesion (the tablets can be directly separated from each other), slight adhesion (the tablets can be forcibly separated, with no damage to the adhesion surface), obvious adhesion (some areas of the tablets were directly adhered together, unable to separate), and severe adhesion (there are mutual adhesion at some areas, unable to separate).

TABLE 2

| Group | Stability during forming | 24 h | 48 h | 72 h | 96 h |
|---|---|---|---|---|---|
| Example 1 | Successful forming, without breaking | No adhesion | No adhesion | No adhesion | No adhesion |
| Example 2 | Successful forming, without breaking | No adhesion | No adhesion | No adhesion | No adhesion |
| Example 3 | Successful forming, without breaking | No adhesion | No adhesion | No adhesion | No adhesion |
| Example 4 | Successful forming, without breaking | No adhesion | No adhesion | No adhesion | No adhesion |
| Example 5 | Successful forming, without breaking | No adhesion | No adhesion | No adhesion | No adhesion |
| Comparative Example 1 | Successful forming, without breaking | No adhesion | No adhesion | No adhesion | No adhesion |
| Comparative Example 2 | Successful forming, without breaking | No adhesion | No adhesion | No adhesion | No adhesion |
| Comparative Example 3 | Successful forming, without breaking | No adhesion | No adhesion | No adhesion | No adhesion |
| Comparative Example 4 | Successful forming, without breaking | No adhesion | No adhesion | No adhesion | No adhesion |
| Comparative Example 5 | Successful forming, without breaking | No adhesion | No adhesion | No adhesion | No adhesion |
| Comparative Example 6 | Successful forming, without breaking | No adhesion | No adhesion | No adhesion | No adhesion |
| Comparative Example 7 | Successful forming, without breaking | No adhesion | No adhesion | Slight adhesion | Obvious adhesion |
| Comparative Example 8 | Successful forming, without breaking | No adhesion | Slight adhesion | Obvious adhesion | Severe adhesion |
| Comparative Example 9 | Successful forming, without breaking | No adhesion | No adhesion | No adhesion | No adhesion |
| Comparative Example 10 | Successful forming, without breaking | No adhesion | No adhesion | No adhesion | No adhesion |
| Comparative Example 11 | Successful forming, without breaking | No adhesion | No adhesion | Slight adhesion | Obvious adhesion |
| Comparative Example 12 | Unsuccessful forming | — | — | — | — |
| Comparative Example 13 | Successful forming | Slight adhesion | Obvious adhesion | Severe adhesion | Severe adhesion |
| Comparative Example 14 | Successful forming, without breaking | No adhesion | No adhesion | Slight adhesion | Obvious adhesion |
| Comparative Example 15 | | | | | |

According to the test data in Table 2, it can be seen that the detergent tablets of Examples 1-5 do not break during forming and exhibit excellent moisture resistance and high stability at 24, 48, 72, and 96 hours.

The adhesion phenomena of the detergent tablet in Examples 1-3 at 24, 48, 72, and 96 hours are shown in FIG. 1.

Figure 2:
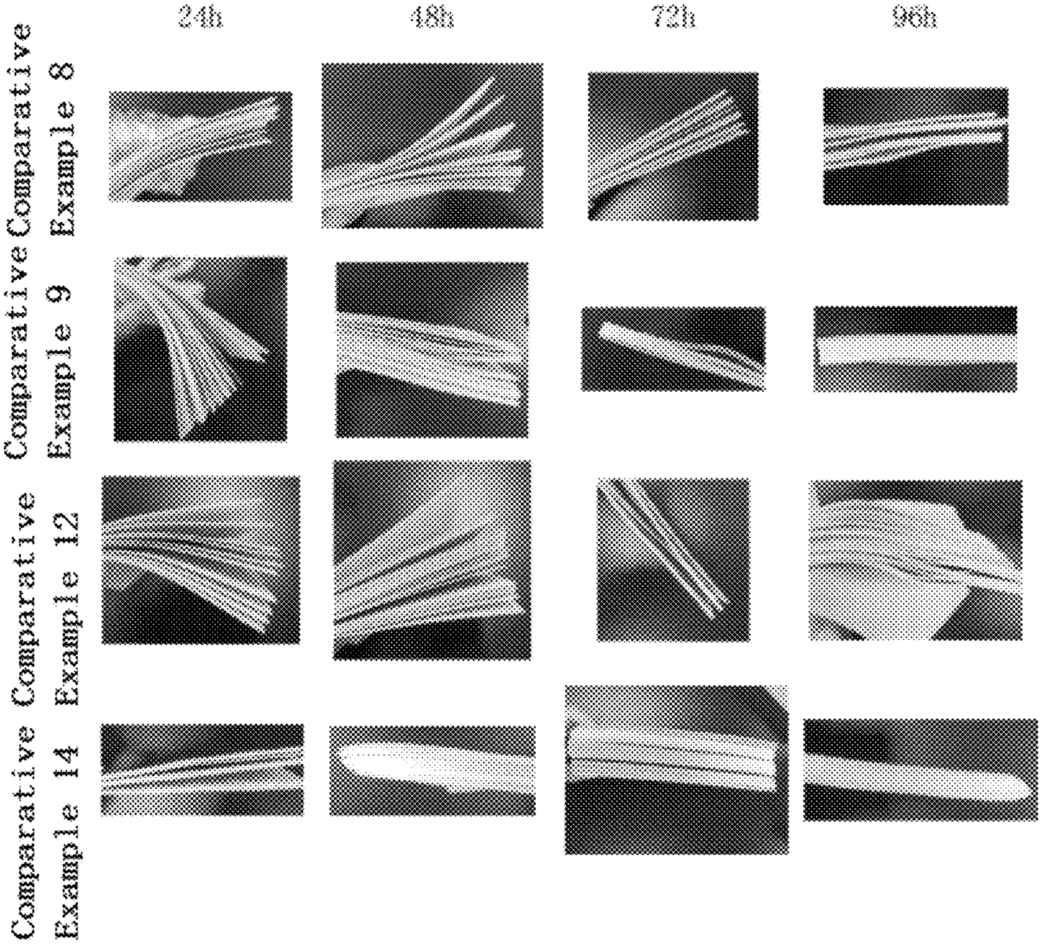
FIG. 2 shows test results of detergent tablet of Comparative Examples 8, 9, 12, and 14 in Test 2.

Reference is made to FIG. 2 for the adhesion phenomena of detergent tablet in Comparative Examples 8, 9, 12, and 14 at 24, 48, 72, and 96 hours.

Test 3: Drying Resistance

According to QB/T5779-2023 "Detergent Tablets", the detergent tablet was placed in a temperature testing environment of (55±2)° C., an analytical balance was used to weigh the weight of the detergent tablets before and after testing, and the weight loss rate was calculated and recorded in Table 3.

A weight loss rate greater than 15.0% was considered unqualified, while a rate less than or equal to 15% was considered qualified.

At the same time, the shape of the removed detergent tablet was observed and recorded as forming stability in Table 3.

TABLE 3

| Group | Stability during forming | Weight loss rate/% | Qualification |
|---|---|---|---|
| Example 1 | Intact | 0.99 | Qualified |
| Example 2 | Intact | 1.05 | Qualified |
| Example 3 | Intact | 1.1 | Qualified |
| Comparative Example 1 | Intact | 1.15 | Qualified |
| Comparative Example 2 | Intact | 1.18 | Qualified |
| Comparative Example 8 | Intact | 2.02 | Qualified |

TABLE 3-continued

| Group | Stability during forming | Weight loss rate/% | Qualification |
|---|---|---|---|
| Comparative Example 9 | Intact, but having crack | 12.44 | Qualified |
| Comparative Example 10 | Brittle tablet, broken | 1.64 | Unqualified |
| Comparative Example 11 | Intact | 1.32 | Qualified |
| Comparative Example 12 | Intact | 10.82 | Qualified |
| Comparative Example 14 | Broken | 20.29 | Unqualified |
| Comparative Example 15 | Intact | 2.57 | Qualified |

Although the detergent tablet of Comparative Example 10 has a low weight loss rate and was successfully formed, it was not soft and has a brittle texture. After losing moisture, it was more likely to have cracks on the surface, not drying resistant, and break into fragments. Therefore, it was judged as unqualified.

Test 4: Solubility

According to QB/T5779-2023 “detergent tablets”, a 1 L beaker was filled with 700 mL of hard water (250 mg/kg of calcium chloride), and placed in a water bath environment at (23±2° C.) The stirring speed of magnetic stirring was adjusted. The detergent tablet was cut into 3 cm*3 cm square pieces, and was thrown vertically into water at a place of 10 cm parallel to the water surface. Timing was started when the detergent tablet touches the water surface, and stopped when the sample was completely dispersed in water, thereby obtaining the dissolving time. The tests were repeated for 3 times.

The dissolving time was recorded in Table 4.

TABLE 4

| Group | dissolving time/s | qualified judgment |
|---|---|---|
| Example 1 | 16.21 | Qualified |
| Example 2 | 17.17 | Qualified |
| Example 3 | 36.43 | Qualified |
| Example 4 | 76.86 | Qualified |
| Comparative Example 1 | 16.32 | Qualified |
| Comparative Example 2 | 17.25 | Qualified |
| Comparative Example 4 | 17.00 | Qualified |
| Comparative Example 5 | 16.52 | Qualified |
| Comparative Example 6 | 17.21 | Qualified |
| Comparative Example 8 | 17.94 | Qualified |
| Comparative Example 9 | 22.82 | Qualified |
| Comparative Example 10 | 136.11 | Unqualified |
| Comparative Example 11 | 150.41 | Unqualified |
| Comparative Example 12 | 60.74 | Qualified |
| Comparative Example 14 | 62.54 | Qualified |
| Comparative Example 15 | 26.01 | Qualified |

Although the moisture resistance stability of ratios 10 and 11 was good, in the detection of solubility, the dissolving time was longer and the overall performance was poor.

Comparative Example 12 was a detergent tablet containing SLS, while Comparative Examples 13 and 14 were detergent tablets made by completely or partially replacing SLS with other anionic surfactants. When completely replacing the SLS component (Comparative Example 13), the detergent tablet cannot be formed. When partially replacing SLS (Comparative Example 14), although it can be successfully formed, its moisture and drying resistance stability was poor. Under 24-hour high humidity environment, the detergent tablet slightly adheres, and under 55° C. drying environment, the weight loss rate of the detergent tablet was greater than 15%, and it becomes uneven fragments, which belongs to unqualified detergent tablets. This indicates that SLS was a key component for the molding and stability of detergent tablets. Simply replacing SLS with other surfactants cannot obtain qualified and stable detergent tablets.

Without using SLS, this application selects a specific system to produce detergent tablet, which have fast dissolving, good moisture and drying resistance, and excellent stain removal effect, and have good development prospects.

This specific embodiment is only an explanation of the present application and is not a limitation of the present application. After reading this specification, those skilled in the art may make modifications to the present embodiment as needed, without paying creative contributions. However, as long as they are within the scope of the claims of the present application, they are protected by the Patent Law.

What is claimed is:

1. A detergent tablet free of sodium lauryl sulfate (SLS) surfactant, wherein the detergent tablet free of SLS surfactant is prepared by drying a slurry, and the slurry comprises the following raw materials by weight percentages: 10%-40% film-forming agent, 15%-40% anionic surfactant, 2%-12% non-ionic surfactant, 0.5%-5% chelating agent, 0.4%-4% enzyme preparation, 0.5%-5% auxiliary agent, and 0.1%-1% essence;

wherein the film-forming agent comprises film-forming agent A and film-forming agent B, the film-forming agent A is polyvinyl alcohol, and the film-forming agent B comprises at least one of cellulose or dodecenyl succinate starch ester, and a weight ratio of the film-forming agent A to the film-forming agent B is (2-15):1;

the anionic surfactant comprises at least two of sodium α-olefin sulfonate, sodium fatty acid methyl ester sulfonate, or sodium hydroxyethyl sulfonate;

the non-ionic surfactant comprises at least two of fatty alcohol polyoxyethylene ether, fatty acid methyl ester ethoxylate, oil ethoxylate, ethylene-oxide/propylene-oxide (EO/PO) block polyether, plant saponin, alkyl glycoside, or alcohol ether glycoside; and the chelating agent comprises at least one of gluconic acid and salts of the gluconic acid, glutamic acid diacetic acid and salts of the glutamic acid diacetic acid, methyl glycine diacetic acid and salts of the methyl glycine diacetic acid, or aspartic acid diacetic acid and salts of the aspartic acid diacetic acid.

2. The detergent tablet according to claim 1, wherein the film-forming agent is the film-forming agent A and the film-forming agent B, and the film-forming agent B is the cellulose; and the anionic surfactant is the sodium α-olefin sulfonate and the sodium fatty acid methyl ester sulfonate.

3. The detergent tablet according to claim 2, wherein based on the weight percentage of the slurry, the polyvinyl alcohol is 10-26%, the cellulose is 1-5%, the sodium α-olefin sulfonate is 15-25%, and the sodium fatty acid methyl ester sulfonate is 5-15%.

4. The detergent tablet according to claim 2, wherein the non-ionic surfactant is at least two of the fatty alcohol polyoxyethylene ether, the fatty acid methyl ester ethoxylate, or the oil ethoxylate.

5. The detergent tablet according to claim 4, wherein based on the weight percentage of the slurry, the fatty alcohol polyoxyethylene ether is 1-5%, and the oil ethoxylate is 1-5%.

6. The detergent tablet according to claim 1, wherein the slurry further comprises 0-25% weight percentage of a filler.

7. The detergent tablet according to claim 6, wherein the filler comprises at least one of corn starch, pea starch, cassava starch, zeolite, bentonite, kaolin, sodium sulfate, sodium carbonate, or sodium bicarbonate.

8. The detergent tablet according to claim 1, wherein the enzyme preparation comprises at least two of cellulase, protease, amylase, lipase, pectinase, mannanase, or phosphodiesterase.

9. The detergent tablet according to claim 1, wherein the auxiliary agent comprises at least one of glycerol, propylene glycol, or glucose alcohol.

10. A method for preparing the detergent tablet according to claim 1, comprising the following steps:

Step 1: mixing the film-forming agent A with water at 75-85° C. until completely swelling and dissolving;

Step 2: adding the film-forming agent B and continuing to stir until fully dissolved;

Step 3: adding the chelating agent, the anionic surfactant, and the non-ionic surfactant, and dissolving for 15-60 minutes;

Step 4: adding a remainder of the raw materials at 40-45° C. to obtain the slurry; and Step 5: drying the slurry, and forming into tablets to obtain the detergent tablet free of SLS surfactant.

* * * * *